E. SCHNEIDER.
APPARATUS FOR LOADING GUNS.
APPLICATION FILED FEB. 14, 1918.
1,310,890.
Patented July 22, 1919.
8 SHEETS—SHEET 1.
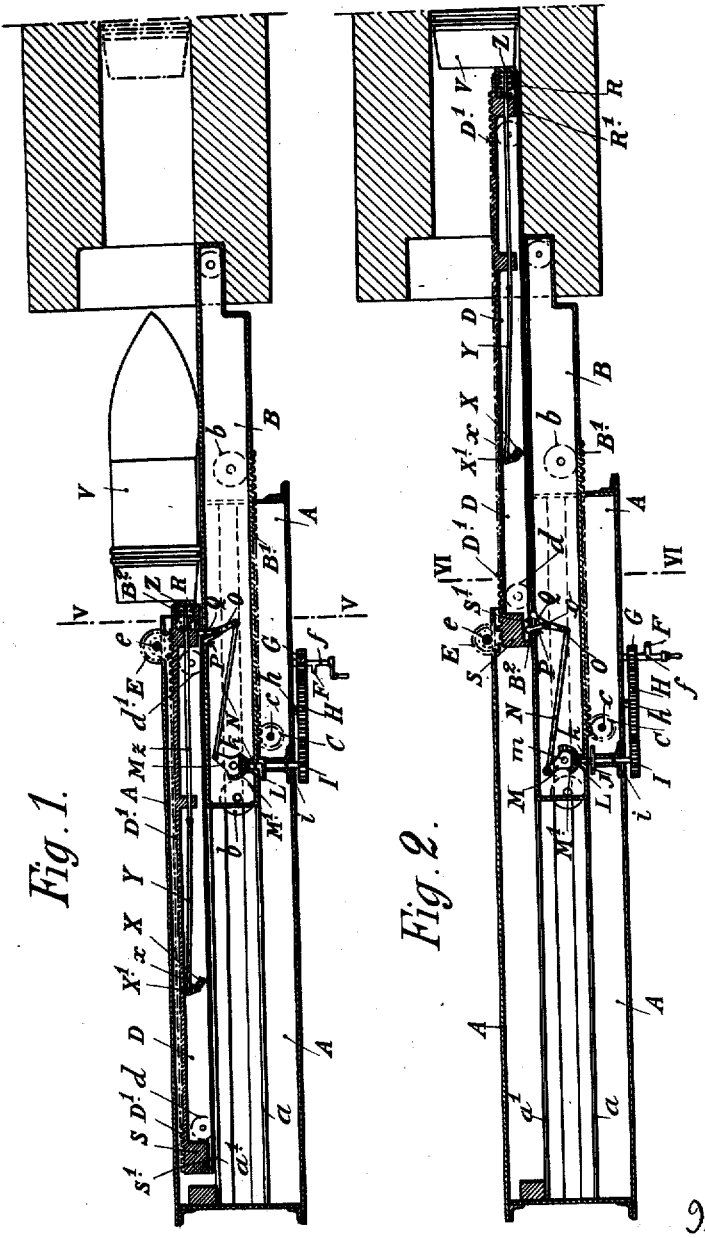

E. SCHNEIDER.
APPARATUS FOR LOADING GUNS.
APPLICATION FILED FEB. 14, 1918.
1,310,890.
Patented July 22, 1919.
8 SHEETS—SHEET 2.
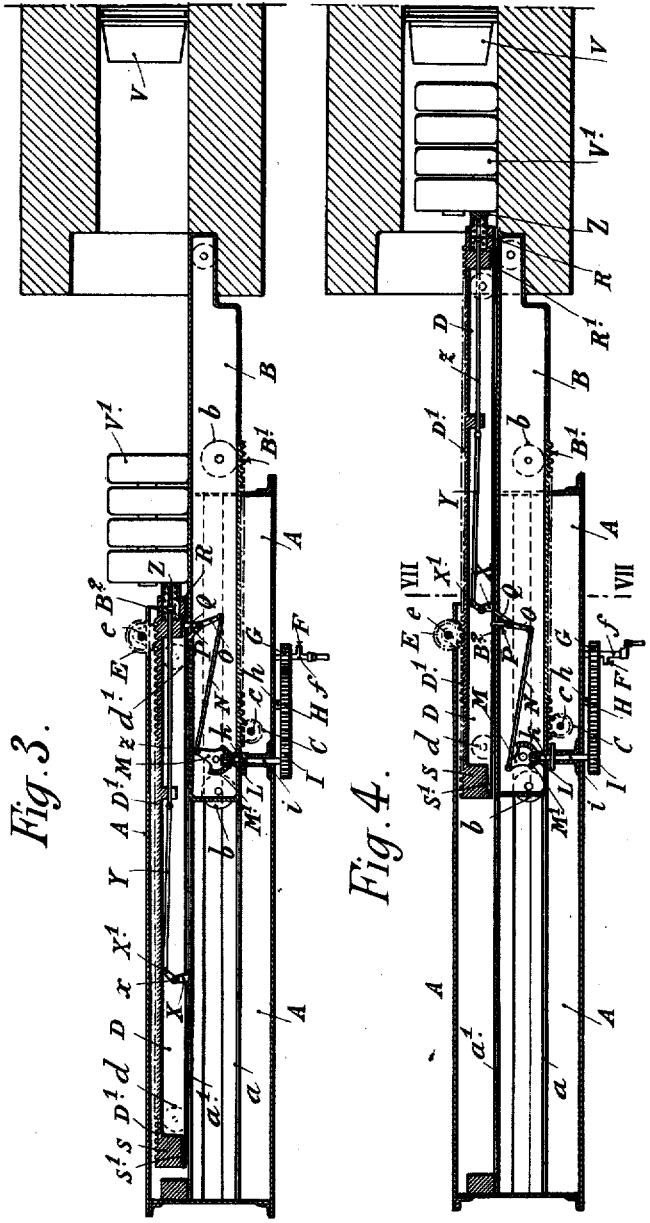

E. SCHNEIDER.
APPARATUS FOR LOADING GUNS.
APPLICATION FILED FEB. 14, 1918.
1,310,890.
Patented July 22, 1919.
8 SHEETS—SHEET 3.
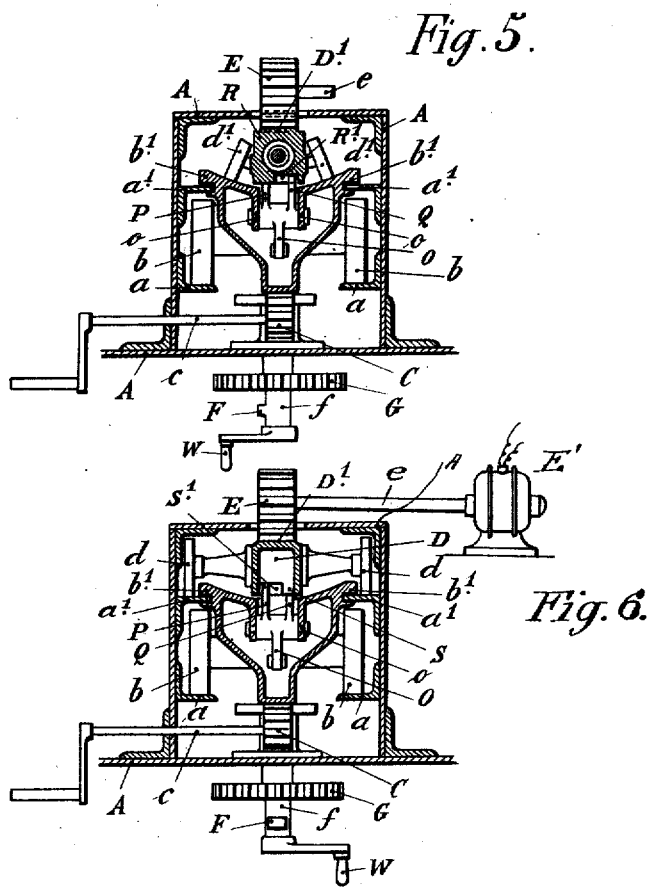
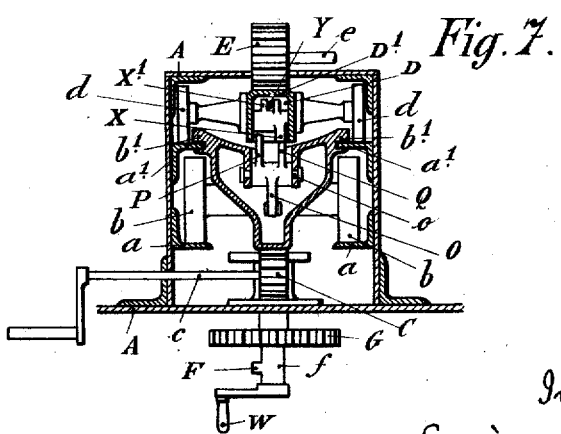
Inventor:
Eugene Schneider
By Mauro, Cameron, Lewis & Massie,
Attorneys.

E. SCHNEIDER.
APPARATUS FOR LOADING GUNS.
APPLICATION FILED FEB. 14, 1918.

1,310,890.

Patented July 22, 1919.
8 SHEETS—SHEET 4.

E. SCHNEIDER.
APPARATUS FOR LOADING GUNS.
APPLICATION FILED FEB. 14, 1918.

1,310,890.

Patented July 22, 1919.
8 SHEETS—SHEET 5.

Inventor:
Eugène Schneider
By Mauro, Cameron, Lewis & Massie,
Attorneys.

E. SCHNEIDER.
APPARATUS FOR LOADING GUNS.
APPLICATION FILED FEB. 14, 1918.
1,310,890.
Patented July 22, 1919.
8 SHEETS—SHEET 6.
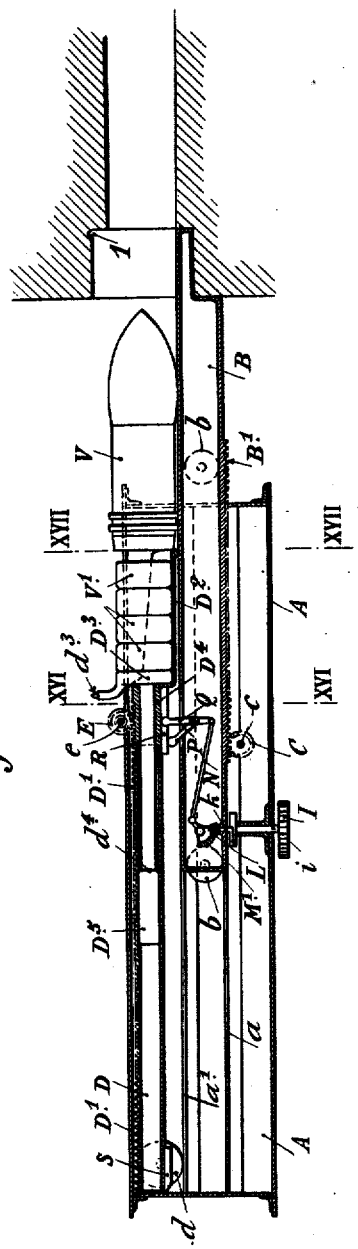
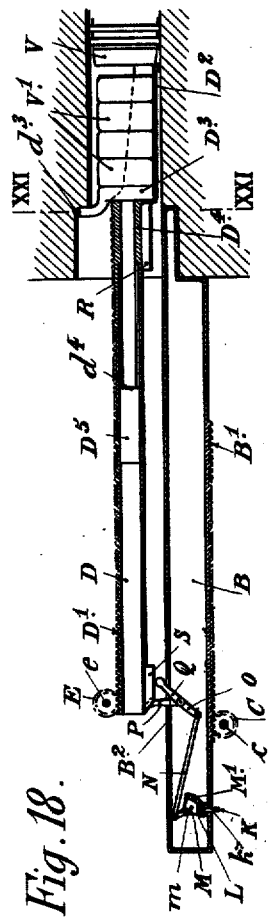
Inventor:
Eugène Schneider
By
Mauro, Cameron, Lewis & Massie,
Attorneys

E. SCHNEIDER.
APPARATUS FOR LOADING GUNS.
APPLICATION FILED FEB. 14, 1918.

1,310,890.

Patented July 22, 1919.

E. SCHNEIDER.
APPARATUS FOR LOADING GUNS.
APPLICATION FILED FEB. 14, 1918.

1,310,890.

Patented July 22, 1919.
8 SHEETS—SHEET 8.

Inventor:
Eugène Schneider
By
Mauro, Cameron, Lewis & Massie.
Attorneys.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

APPARATUS FOR LOADING GUNS.

1,310,890.  Specification of Letters Patent.  Patented July 22, 1919.

Application filed February 14, 1918. Serial No. 217,193.

*To all whom it may concern:*

Be it known that I, EUGÈNE SCHNEIDER, a citizen of the French Republic, and a resident of 42 Rue d'Anjou, Paris, France, have invented new and useful Improvements in Apparatus for Loading Guns, which invention is fully set forth in the following specification.

This invention has for its object to provide an improved apparatus for loading guns. The improved apparatus comprises as usual a loading carriage traveling in a framing located at the rear of the gun barrel, and having the shape of a scoop for receiving the parts of the gun charge (projectile and powder charge). In the same framing there is guided a rammer to which to-and-fro motion is imparted from an electric motor.

The invention consists in an apparatus that enables the actual movements of the rammer to produce automatically the necessary stoppages of the driving motor at the ends of the forward (loading) stroke and the rearward stroke of the rammer actuated by the said motor, as well as the reversal of the said motor when the rammer has arrived at the end of its forward stroke.

According to the invention the improved apparatus comprises a clutch of which one member is located on a shaft mounted in the fixed framing and ending at the controller of the electric motor. The other member of the clutch is located on the scoop shaped loading carriage and is connected to a shaft mounted in the loading carriage, said shaft being operated by means of tappets by the rammer at the ends of the forward and rearward strokes of the latter.

Two embodiments of this invention are illustrated by way of example in the accompanying drawings in which:—

Figures 1 to 14 show one embodiment;

Figs. 1, 2, 3 and 4 are longitudinal sections along the axis of the improved apparatus, showing the parts in the requisite positions for loading a complete charge (projectile and powder charge) into the gun breech;

Figs. 5, 6 and 7 are cross sections, drawn to a larger scale respectively, on the lines V—V of Fig. 1; VI—VI of Fig. 2; and VII—VII of Fig. 4;

Fig. 8 is a detail sectional elevation of the clutch mechanism between the shaft mounted in the loading carriage and actuated by the rammer, and the shaft mounted in the fixed framing and ending at the controller of the electric motor;

Figs. 9 and 10 are corresponding cross sections respectively on the lines IX—IX and X—X of Fig. 8;

Figs. 11, 12, 13 and 14 are diagrammatic views showing the various positions of the parts of the clutch mechanism during the to-and-fro movements of the rammer:

Figs. 15 to 21 show the second embodiment of the invention.

Figure 8:
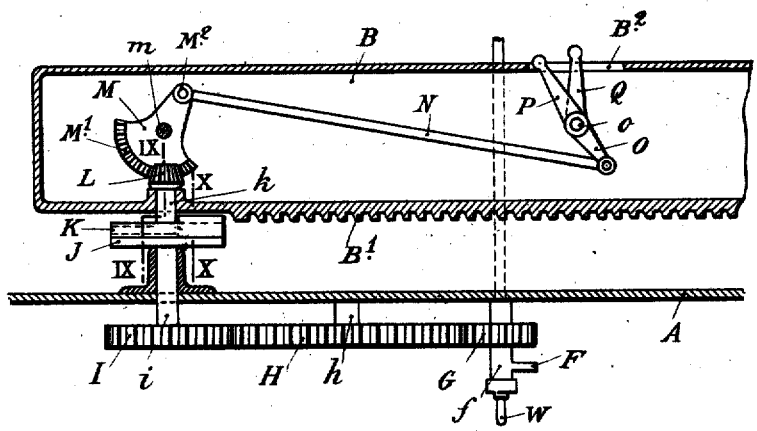

As shown, the improved loading apparatus comprises as usual a fixed framing A provided with rolling tracks $a$ for the wheels $b$ of a scoop-shaped loading carriage B, and also, if desired, guide ways $a^1$ for edges $b^1$ of the said carriage. This carriage carries a rack $B^1$ by means of which it can be moved into the loading position shown in Figs. 1 to 4, by actuating a pinion C fixed on a shaft $c$ journaled in the fixed framing.

The rammer D is movable in the framing A, and for this purpose it is provided with a pair of wheels $d$ rolling on the guideway $a^1$—$a^1$ which is suitably prolonged to the rear. The rammer is further provided at its front end with a pair of wheels $d^1$ rolling on the upper side of the carriage B. To-and-fro motion is imparted to the rammer by means of a pinion E meshing with a rack $D^1$ formed on the upper side of the rammer. The shaft $e$ on which the pinion E is fixed, receives its motion from an electric motor (not shown).

The improved apparatus produces the stoppages of the motor at the ends of the forward loading and rearward strokes of the rammer; it further effects automatically the reversal of the motor for the return run of the latter.

For this purpose, an actuating member F for actuating a switch or other part controlling the electric motor, is located on the shaft $f$ journaled in the fixed framing A. Upon this shaft $f$ is fixed a pinion G connected through a toothed wheel H fixed on an intermediate shaft $h$, to a pinion I fixed on a shaft $i$ which is likewise journaled in the fixed framing A.

Upon the shaft $i$ which forms part of the gear I—H—G—$f$—F, there is fixed one member J of a clutch J—K hereinafter described in detail.

The other member K of the said clutch is mounted on a shaft $k$ journaled in the loading carriage B. On the shaft $k$ is fixed a bevel pinion L which constitutes one of the parts of a gear actuated by the rammer D when the latter has arrived at one of its end positions. This gear may comprise, as shown, a toothed arc $M^1$ formed on a rocking beam M fixed on an axle $m$ journaled in the carriage B. The end $M^2$ of the rocking beam, farthest from the arc $M^1$, is connected by a link N to a lever O fixed on an axle $o$ journaled in the carriage B.

The hub of this lever has two upwardly projecting fingers P and Q adapted respectively to engage a forward stop R and a rear stop S provided on the underside of the rammer D.

At the end of the forward stroke of the rammer the impact between the rear stop S and the finger Q will produce, by the tilting of the finger Q and the depression of the latter under the stop, a rocking movement of the lever O which will have the result of actuating through the gear N—M—$M^1$, the pinion L in such a manner as to move the clutch member K into engagement with the other clutch member J. Inversely, the impact between forward stop R and the finger P at the end of the rearward stroke, will cause the lever O to rock in the reverse direction and move the clutch member K back into its initial position. The clutch member K is movable in a sector shaped recess $j$ formed in the disk J, as is clearly shown in Figs. 8 to 15. The sides $j^1$ and $j^2$ of this recess are arranged to strike alternately against the sides of the member K. The intermediate pinion H is connected at a point $H^1$ of its periphery through the medium of a spring T to a fixed point U located on the framing.

Figure 9:
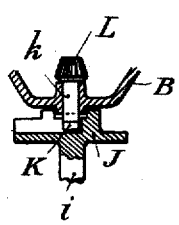
Figure 10:
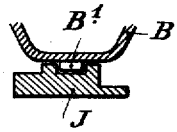
Figure 11:
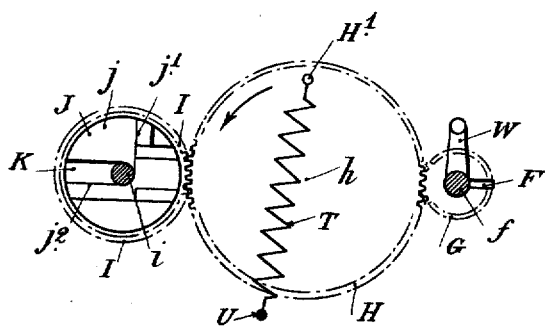
Figure 12:
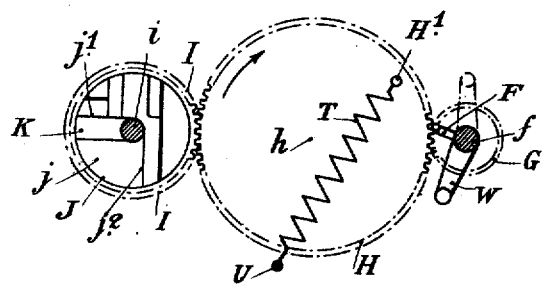
Figure 13:
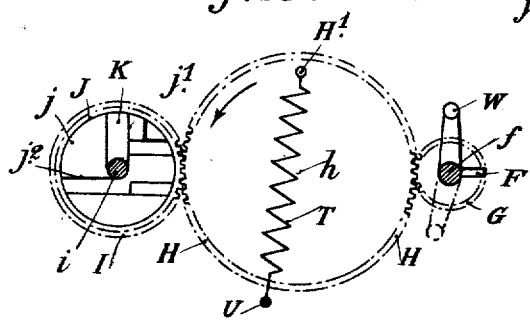

Figs. 8, 9 and 11 show the parts of the clutch mechanism in the position of rest that corresponds to a position of the member F that secures the stoppage of the motor; the rammer then occupying its extreme rear position (Figs. 1 and 5). In this position the spring T has a tendency to rotate the wheels H and I in the directions of the arrow (Fig. 11); but this motion is prevented by the side $j^2$ bearing against the member K which is in its turn held stationary by reason of the engagement between the pinion L and the arc $M^1$, and the bearing of the finger P against the bottom of the buttonhole-shaped recess $B^2$.

The operation of the improved apparatus is as follows:—

The parts being in the position shown in Figs. 1, 5, 8, 9 and 11, a projectile V is placed by the usual means upon the scoop shaped loading carriage, the rear end of the projectile being in contact with the head of the ram.

By means of a crank handle W fixed on the shaft $f$ which carries the member F for actuating the controller, the said shaft is rotated in such a manner as to effect the starting of the electric motor.

This operation is performed from the position shown in Fig. 11 and by rotating the crank handle W from right to left. It will be noted that, this movement, is, by the way, the only possible direction for this operation.

This movement is continued until the side $j^1$ of the sector-shaped recess $j$ strikes against the clutch member K which has remained stationary. The members of the clutch J—K and of the gear I—H—G then occupy the positions shown in Fig. 12. From this movement onward the spring T has a tendency to rotate the wheel H in the direction of the arrow (Fig. 12); this position corresponds to the starting of the motor caused by the member F.

The shaft $e$ now revolving in the proper direction, actuates through the pinion E the rammer D which pushes the projectile into the breech chamber of the gun. The parts of the apparatus then occupy the positions shown in Figs. 2 and 6. During this movement of the rammer the clutch members J, K retain the position shown in Fig. 12, until the finger Q strikes the stop S. The finger Q is forced down by the stop and in that movement it moves with it the gear O—N—M—$M^1$, and thus brings the member K into the position shown in Fig. 13, moving through the said member the member J, and through the latter the gear I—H—G. As shown in Figs. 2 and 6, the finger P is engaged in a recess $S^1$ formed in the rear face of the rammer parallelly to the stop S.

Figure 14:
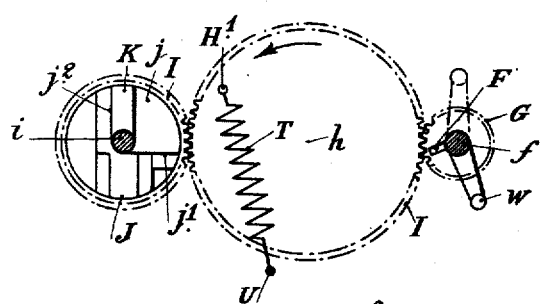

The member F for actuating the controller is thereby brought into the position in which it acts to stop the motor The motor being thus stopped the spring T will have freedom to act, and will thus move the member J into the position shown in Fig. 14, while the gear H—G has moved the member F for actuating the controller into position for causing the motor to run backward.

The pinion E thus drives the rack $D^1$ in such a manner as to cause the rammer to make its rearward stroke and thus return into its initial position. Just before the end of this return movement the finger P is struck by the stop R located on the front face of the rammer, whereby the said finger is caused to tilt, while the finger Q becomes engaged in the parallel slot $R^1$.

The rocking of the finger P has had the effect of actuating the gear O—M—N—$N^1$—L, and thus to cause the member K to move from the position shown in Fig. 14 into the position shown in Fig. 11. In this position the motor is caused to stop.

When the gun charge consists of a projectile and powder charges combined, in a single cartridge, the rammer has to make in each loading operation, a single to-and-fro stroke of a length proportionate to the length of the said cartridge to be loaded into the gun.

When, however, as in the example shown, the gun charge consists of a separate projectile and powder-charges, the loading is generally performed in two stages in order to reduce as much as possible the length and bulk of the loading apparatus.

In such a case provision must be made to enable the rammer to make a longer stroke for loading the projectile than that required for loading the powder-charges.

The rear stop S—S¹ intervenes for the purpose of actuating the lever P, only during the period of pushing the projectile into the gun breech. An auxiliary stop is constituted by one of the arms X of a rocking member X—X pivoted on an axle $x$ located on the rammer. The other arm X¹ of said member is connected by a link Y to the stem $z$ of a spring stop Z.

During the ramming of the projectile the spring stop Z is moved out of the way as shown in Figs. 1 and 2, and is moved at the same time the stop X out of the way. Normally in the absence of a projectile, the stop Z is caused by its spring to project from the head of the rammer, the stop X then being in the position shown in Figs. 3 and 4. For the ramming operation the powder-charges V¹ are placed in position in front of the stop Z, their mass being insufficient to overcome the force of the spring of this stop. It is to be understood that, at the end of the forward stroke, the stop X performs in relation to the finger Q, exactly the same function that was performed by the stop S in the ramming of the projectile. The moving of the finger Q out of the way by the stop X is clearly shown in Figs. 4 and 7.

Figure 21:
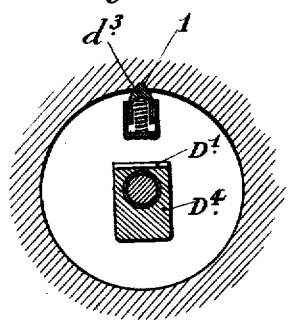

Figs. 15 and 21 illustrates the second embodiment wherein the rammer is so constructed as to enable the loading of a charge comprising a projectile with its powder-charges, to be performed in one stroke of the rammer.

Fig. 15 is a sectional side elevation showing the parts in their positions at the beginning of the forward (loading) stroke of the rammer.

Figure 16:
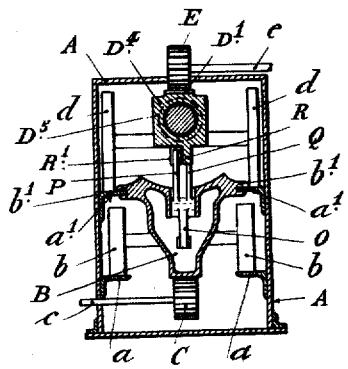
Figure 17:
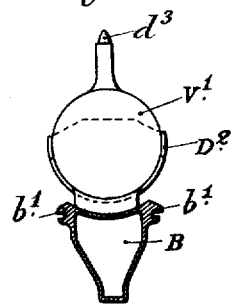

Figs. 16 and 17 are vertical cross sections respectively on the lines XVI—XVI and XVII—XVII of Fig. 15.

Figure 19:
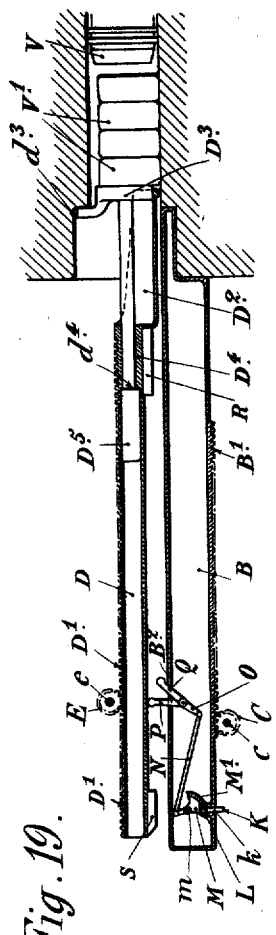
Figure 20:
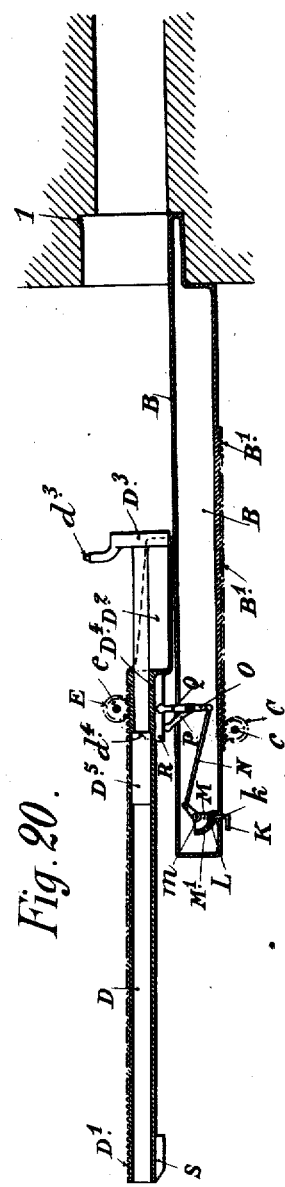

Figs. 18, 19 and 20 are longitudinal sections showing the parts in their positions during various stages of the loading operation.

Fig. 21 is a vertical cross section on the line XXI—XXI of Fig. 18.

In this embodiment of the invention the rammer comprises at its forward end a scoop D² designed for receiving the powder charges V¹ during the stage of the loading operation that corresponds to the ramming of the projectile.

The rammer further comprises a piston D³ provided with a spring catch $d^3$ adapted to engage in a recess $l$ formed in the breach of the gun.

At the beginning of the ramming operation the parts are in the positions shown in Fig. 15. The projectile V bears with its rear end against the front edge of the rammer scoop D², and the powder-charges V¹ are situated in the said scoop, the rearmost powder-charge bearing against the piston D³.

In the ramming stroke, the entire gun charge is pushed into the gun chamber into which the scoop D² enters temporarily; the catch $d^3$ engaging at the end of the said stroke in the recess $l$ as shown in Fig. 18. In the rearward stroke, the scoop D² slides away from underneath the powder-charges V¹ which are retained in the gun chamber by the piston D³ the spring catch holding the piston against any tendency to move backward with the scoop. When the parts have come into the positions shown in Fig. 19, the guide sleeve D⁴ of the piston rod will be in contact at its rear end $d^4$ with the enlarged portion D⁵ of the said piston rod, and will thus move the piston D³ back with it in the rearward stroke of the rammer, the spring catch yielding under the power applied and releasing the piston.

When this rearward stroke is completed, the parts will be in the positions shown in Fig. 20. It will then be sufficient to push back the piston D³ in order to return it into the initial position shown in Fig. 15.

Having now described my invention, what I claim as new and desire to secure by Letters Patent is:—

1. In an apparatus for loading guns, the combination with a loading carriage, a fixed framing in which said loading carriage can be moved out of the way during firing and in which said carriage travels, a rammer having a to-and-fro motion in said fixed framing, and a motor for operating said rammer, of a first clutch member located on said loading carriage a coöperating second clutch member located on said fixed framing, an actuating member for actuating a controlling device for starting and stopping said motor, a first gear whereof said coöperating second clutch member forms a part and ending at said actuating member, and a second gear whereof said first clutch member forms a part actuated by said rammer in its to-and-fro movements whereby the to-and-fro movements of said rammer determine automatically the starting and stopping of the latter.

2. In an apparatus for loading guns, the combination with a loading carriage, a fixed framing in which said loading carriage can be moved out of the way during firing, and in which said carriage travels a rammer having a to-and-fro motion in said fixed framing, and a motor for operating said rammer, of a first clutch member located on said loading carriage, a coöperating second clutch member located on said fixed framing, an actuating member for actuating a controlling device for starting and stopping said motor, a first gear whereof said coöperating second clutch member forms a part ending at said actuating member, a second gear whereof said first clutch member forms a part actuated by said rammer in its to-and-fro movements, whereby the to-and-fro movements of said rammer determine automatically the starting and stopping of the latter, a front and a rear stop located on said rammer, for actuating said second gear at the ends of the strokes of said rammer, a lever for said second gear, acted upon by said stops, and an auxiliary stop which acts in substitution for said back stop in the ramming of the powder-charges, said auxiliary stop being rendered inoperative by the projectile while the latter is being rammed.

In testimony whereof I have signed this specification.

EUGÈNE SCHNEIDER.

Witnesses:
ANDRÉ MOSTICKER,
CHAS. P. PRESSLY.

Copies of this patent may be obtained for five cents each, by addressing the "Commissioner of Patents, Washington, D. C."